(12) United States Patent
Al-Sulaiman (10) Patent No.: US 9,500,185 B2
(45) Date of Patent: Nov. 22, 2016

(54) SYSTEM AND METHOD USING SOLAR THERMAL ENERGY FOR POWER, COGENERATION AND/OR POLY-GENERATION USING SUPERCRITICAL BRAYTON CYCLES

(71) Applicant: King Fahd University of Petroleum and Minerals, Dhahran (SA)

(72) Inventor: Fahad Abdulaziz Al-Sulaiman, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 190 days.

(21) Appl. No.: 14/461,024

(22) Filed: Aug. 15, 2014

(65) Prior Publication Data

US 2016/0047361 A1 Feb. 18, 2016

(51) Int. Cl.
| F03G 6/06 | (2006.01) |
| F01K 25/10 | (2006.01) |
| F01K 23/06 | (2006.01) |
| F01K 23/02 | (2006.01) |
| F01K 23/08 | (2006.01) |
| F01K 23/10 | (2006.01) |
| F01K 25/08 | (2006.01) |

(52) U.S. Cl.
CPC ............... *F03G 6/06* (2013.01); *F01K 23/02* (2013.01); *F01K 23/06* (2013.01); *F01K 23/08* (2013.01); *F01K 23/10* (2013.01); *F01K 23/101* (2013.01); *F01K 25/08* (2013.01); *F01K 25/10* (2013.01); *F03G 6/064* (2013.01); *F03G 6/065* (2013.01); *F03G 6/067* (2013.01); *F01K 25/103* (2013.01); *Y02E 10/10* (2013.01); *Y02E 10/41* (2013.01); *Y02E 10/44* (2013.01); *Y02E 10/46* (2013.01)

(58) Field of Classification Search
CPC .......... F03G 6/06; F03G 6/067; F03G 6/065; F03G 6/064; F01K 25/10; F01K 23/10; F01K 25/08; F01K 23/101; F01K 23/08; F01K 23/06; F01K 23/02; F01K 25/103; Y02E 10/41; Y02E 10/46; Y02E 10/44; Y02E 10/10
USPC ............. 60/39.182, 655, 641.8–641.15, 651, 60/671, 650, 682–684
See application file for complete search history.

(56) References Cited

U.S. PATENT DOCUMENTS

| 3,630,022 | A | * | 12/1971 | Jubb | ............ F02C 1/10 376/391 |
| 4,000,617 | A | * | 1/1977 | Fortescue | ............ F02C 7/143 165/104.21 |
| 4,428,190 | A | * | 1/1984 | Bronicki | ............ F01K 3/04 60/652 |
| 5,448,889 | A | * | 9/1995 | Bronicki | ............ F02C 1/05 60/641.14 |
| 7,685,820 | B2 | | 3/2010 | Litwin et al. | |
| 8,661,778 | B2 | * | 3/2014 | Bronicki | ............ F03G 6/064 60/39.182 |
| 2008/0000231 | A1 | * | 1/2008 | Litwin | ............ F03G 6/06 60/641.11 |

(Continued)

Primary Examiner — Hoang Nguyen
(74) Attorney, Agent, or Firm — Oblon, McClelland, Maier & Neustadt, L.L.P.

(57) ABSTRACT

Methods of operating a supercritical Brayton cycle integrated with another cycle for power, cogeneration, or poly-generation using solar energy as a main source of energy. A system includes a supercritical $CO_2$ Brayton cycle as a topping cycle and any one or more of a power cycle, a cooling cycle, a steam production cycle, and a water desalination cycle as a lower cycle. When not enough solar irradiation is available to power the combined cycle, the lower cycle is only operated or both part of the topping cycle as well as the lower cycle through the solar thermal energy and/or the stored thermal energy.

13 Claims, 12 Drawing Sheets

(56) References Cited

U.S. PATENT DOCUMENTS

| | | |
|---|---|---|
| 2011/0283700 A1 | 11/2011 | Zohar et al. |
| 2012/0216536 A1 | 8/2012 | Ma et al. |
| 2012/0319410 A1 | 12/2012 | Ambrosek et al. |
| 2013/0104546 A1 | 5/2013 | Goswami et al. |
| 2013/0298557 A1* | 11/2013 | Treece .............. F03G 6/06 60/641.15 |

* cited by examiner

SYSTEM AND METHOD USING SOLAR THERMAL ENERGY FOR POWER, COGENERATION AND/OR POLY-GENERATION USING SUPERCRITICAL BRAYTON CYCLES

BACKGROUND OF THE INVENTION

Field of the Invention

A solar thermal energy generation system and method to produce power in first and second energy generation units using solar thermal energy in a first energy generation system (topping system) and waste heat from the first energy generation system and/or solar thermal energy in a second energy system to generate power or other useful energy (such as cooling, heating, distill water, fuel reforming, and/or gasification.

Description of the Related Art

Depletion of fossil fuel and global warming are driving efforts to finding a solution for future clean energy resources. Solar energy is considered one of the major potential renewable energy resources in near future. Solar energy can be converted into thermal energy which can be used to heat a fluid that operates a thermal power plant.

Large amount of thermal energy at high temperature is needed to run the thermal plant in which can be obtained through concentrating the solar energy on a receiver. A fluid is heated though a solar concentrated mean and utilized in the turbine to produce mechanical energy. Examples of concentrated solar energy technologies are parabolic trough solar collector, solar tower (central receiver), Fresnel lenses, and solar dishes.

SUMMARY OF THE INVENTION

The present disclosure includes a solar thermal energy generation system having a solar receiver and first and second energy generation systems connected by an integration loop.

In an embodiment of the disclosure the solar energy received is connected to a hot storage tank and a cold storage tank by a fluid loop in thermal contact with a first heat exchanger.

In another embodiment of the disclosure the first energy generation system is a supercritical Brayton cycle (e.g., topping cycle).

In another embodiment of the disclosure the supercritical Brayton cycle includes a fluid loop, first and second compressors, first and second turbines, low and high thermal recuperators and a pre-cooler.

In another embodiment of the disclosure the second energy generation system (e.g., bottom cycle) includes a fluid loop, third and fourth turbines, a pump and a condenser, and is connected to the low and high thermal recuperators by a fluid loop and/or an integration loop.

In another embodiment of the disclosure the first and second energy generation systems are thermally connected by the integration fluid loop and are in thermal contact with the low and high thermal recuperators.

In another embodiment of the disclosure a fluid loop comprises CO2 in the first energy generation system.

In another embodiment of the disclosure the second energy generation system is at least one selected from the group consisting of a condensing Brayton cycle, an organic Rankine cycle, a steam Rankine cycle, and a Kalina cycle.

In another embodiment of the disclosure a fluid loop comprises at least one selected from the group consisting of a molten salt, steam, organic fluid, and a gas.

In another embodiment of the disclosure the second energy generation system is at least one selected from the group consisting of a water desalination process, a multi-stage flash distillation, a multiple-effect distillation, a vapor-compression process, a humidification dehumidification process, and a reverse osmosis process.

In another embodiment of the disclosure the integration fluid loop includes a fluid control unit with instructions to block circulation of fluid in the integration fluid loop during power generation by the first energy generation system.

In another embodiment of the disclosure integration fluid loop has instructions to control a valve to permit thermal transfer from a solar heat exchanger to the low and high thermal recuperators.

In another embodiment of the disclosure the second energy generation system generates energy obtained as waste heat from the first energy generation system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views.

Turbine technologies are characterized by mainly the complete system cycle configuration, such as Brayton cycle and Rankine cycle. Brayton cycles are of particular interest. When operating above the critical pressure and temperature, a Brayton cycle is called a supercritical Brayton cycle. The working fluid in this supercritical Brayton cycle may be a gas such as $CO_2$, helium, or nitrogen, mixture of gases, etc.

The gas temperature at the exit of the supercritical Brayton cycle (topping cycle) in many cases is high enough to run another cycle, called a bottom cycle. The bottom cycle works under lower temperature as compared to the topping cycle. A combination of two cycles (topping and bottom) is called a combined cycle.

The power produced by the topping cycle is mechanical power through the supercritical turbine. The turbine is connected with electrical generator to produce, for example, electrical power. The bottom cycle can be for the purpose of producing mechanical energy (and, hence, electrical power), such as Brayton cycle, Rankine cycle, or Kalina cycle. Alternately a bottom cycle may be used to produce distilled water, a cooling cycle, a heating process, fuel reforming, a chemical process cycle, for enhancing combustion, or for steam production. When the topping cycle is not working or there is no enough waste energy from the topping cycle to run the bottom cycle, the heat collected through solar energy (either directly from the sun irradiation or the thermal storage) can be used for the bottom cycle. In addition, even if there is enough energy to run the topping cycle, the solar energy could be used to augment the bottom cycle.

Solar irradiation varies along the day and reaches maximum at noon. On the other hand, the plant is designed at its full capacity at a specific range of input solar energy. At low solar radiation time (early of the day or late afternoon or even at a cloudy day), the topping cycle will not receive enough solar energy to operate at its operating design. To resolve this issue (at low solar radiation), the bottom cycle, which requires only relatively low thermal energy, is operated and thus increases the operating time of the system and consequently reduces the cost per kW. Also, a means of storing the thermal energy to have better control of the combined cycle operation is included.

When solar radiation is low, at least two turbine stages (two separate turbines and/or a turbine with at least two stages) may be included in a supercritical Brayton turbine in the topping cycle. In this case we have at least two stages of turbine one of them could work with lower pressure and, hence, requires lower thermal energy. That is, the lower pressure turbine (or lower pressure turbine stage) in the top cycle is working while the high pressure turbine is not. In addition, in this embodiment the bottom cycle could work too.

Thermal storage can be used to operate the lower cycle. For example, the system could be designed to operate with 4 hours storage (operating both systems: combined cycle) and to operate only the bottom cycle at low heat value. Furthermore, in a different embodiment we could have a thermal storage that operates the bottom cycle(s) during night time, for example.

Figure 1:
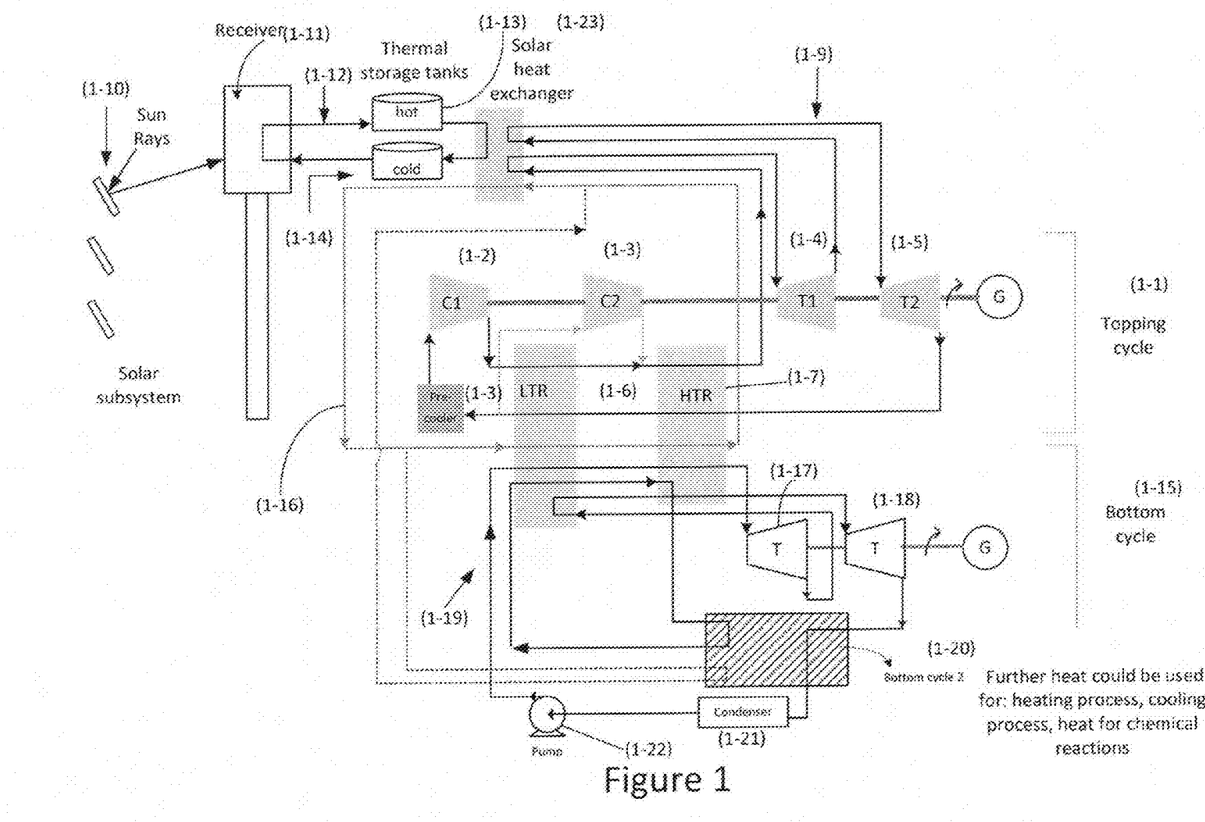
FIG. 1 shows a solar thermal energy subsystem that collects the solar energy and concentrates it onto the receiver as re-compression with two turbines.

FIG. 1 shows a solar thermal energy subsystem that collects solar energy and concentrates it onto the receiver. The type of the solar subsystem shown in the figure is called solar tower (or central receiver). The sun rays falls on the mirrors (1-10) which reflects the rays to the receiver. Thus, the receiver (1-11) receives highly concentrated thermal energy. A relatively cold fluid enters the receiver through a solar fluid loop (1-12) and heated up to a very high temperature. Different types of fluid could be used in the receiver, for example, molten salt, steam, gas, or a mixture of fluids; or the same fluid used in the topping cycle and/or bottom cycles. Another types of solar thermal energy concentrators that can be used (but not limited to) are parabolic trough solar collector, Fresnel lenses, and dishes or a combination of at least two different technologies; or at least the same technology twice (for example, two solar towers; in such a case both towers mainly for the top cycles or mainly one for the topping cycle and one to augment the bottom cycles(s)). The heated fluid enters a solar heat exchanger (1-23).

The thermal energy collected in the receiver could be used to heat directly and/or indirectly the fluids in the topping and/or bottom cycles. The embodiment shown in FIG. 1 is for the indirect heating case through the thermal storage, or without a thermal storage, FIG. 2, while the embodiment in FIG. 3 is for the direct heating case. In other embodiment, there could be both cases (for example, topping cycle indirect heating while the bottom cycle is direct heating or visa versa). The thermal storage can be used to store the heat, for example, for one hour or more than 12 hours to ensure 24 hours of operation of the plant. Further, it can be used to have stable operation of the plant in the aim of reducing intermittent operating of the plant in the case of, for example, a cloudy day. Different types of thermal storage tanks could be used, such as two tanks direct subsystem, two tank indirect subsystem, or single tank system (thermocline), e.g., a hot thermal storage tank (1-13) and a cold thermal storage tank (1-14). A number of fluids (or a mixture of fluids) can be used for thermal storage, such as molten salt, oil, gas, or phase change materials or the same fluid used in the topping cycle. In addition, for some thermal storage tank technologies some solid medium can be used to store the heat, such as quartzite rock and sand for the filler material.

The topping cycle (first energy generation system (1-1)) shown in FIG. 1 is a supercritical Brayton cycle. This type of cycle can be called recompression cycle with turbine reheat. It is called recompression because the fluid in a fluid loop (1-9) is compressed through C2 (1-3) and again mixed with the fluid exits from C1 (1-2), as shown in the figure. Here C1 refers to compressor 1 or first stage of a compressor and C2 refers to compressor 2 or a second stage of compressor. Different fluids can be used in this topping cycle, such as CO2 (preferred fluid). This cycle consists mainly of two compressors (or two compressors stages), (C1, C2), two turbines (or two turbine stage) (T1 (1-4), T2 (1-5)), and at least one thermal recuperator ((1-6) low thermal recuperator: LTR and (1-7) high thermal recuperator: HTR), and a pre-cooler (1-8). Starting from the inlet to the first compressor (C1): the fluid enters C1, and then compressed and exits to be heated (optional) through LTR and/or HTR and mixes with the gas exited from C2. After that, it is heated through the solar heat exchanger and next enters first turbine (T1) and again reheated (optional) through the solar heat exchanger and enters another turbine (T2). T2 is an optional and can be omitted for another embodiment (or in other embodiment, more than two turbines can be used). After the fluid exits from T2, it cools down through LTR and/or HTR. Part of the gas is extracted to C2 and the rest is cooled down through the pre-cooler and, finally, it enters C1 to complete the cycle. The net mechanical power produced through the turbine could be used to rotate another device to produce another form of power, for example, to rotate an electrical generator. The fluid exited from the turbine (T2) is at a relatively high temperature, and hence it can be utilized (through LTR and HTR) to heat the compressed fluid in the topping cycle before it is heated through the solar heat exchanger and consequently improves the overall thermal efficiency. Furthermore, LTR and/or HTR can be used as a heat source to the bottom cycles (second energy generation system (1-20)). In the case there is not enough heat to the bottom cycle through the LTR and/or HTR some heat can be obtained through the solar heat exchanger (e.g., an integration fluid loop (1-16)).

As it known that the solar irradiation varies along the day and there is low solar irradiation intensity, for example, in the early morning. In such a case, there could be two main operating modes:

The solar heat collected is not high enough to operate the topping cycle and hence, it can be used directly to run the bottom cycles.

As the time approaches noon and, consequently the solar irradiation increases the topping cycle can operate (either partially or completely). In the case of the scenario of partial operating mode this following mode can further be considered:

The solar heat collected is used to run only T2 (low pressure turbine), in addition to, the compressors (because there is no enough heat to operate the complete topping cycle). In addition, the solar thermal heat can be used to heat the bottom cycle (1-15). The topping cycle could be designed such that T2 can run even if T1 is not working.

In other embodiment where there is only topping cycle with at least two turbines (no bottom cycle(s)) and a second fluid loop (1-19); in the case there is no enough heat to operate all turbines ((1-17) and (1-18)) because the solar irradiation is low, the turbine(s) that require(s) less heat input is working (while the high pressure turbine (requires high thermal energy) is not working). For this embodiment all other configurations are similar to those shown in FIGS. 5-10 and can be considered as long as there are at least two turbines.

The bottom cycle(s) (second energy generation system) could be for the purpose of electrical power production, cooling, heating, preheating process, steam production, water desalination and/or solar fuel. Examples of electrical power production cycles are Rankine cycle, Brayton cycle, Kalina cycle. Examples of cooling cycles are absorption refrigeration cycle, cooling using ejector, vapor compression refrigeration cycles, and heat pumps for heating. Examples of water desalination process: multi-stage flash distillation, multiple-effect distillation, vapor-compression, humidification dehumidification process, and reverse osmosis. Examples of solar fuels are solar reforming, solar thermolysis, solar thermochemical cycle, electrolysis, solar cracking, and solar gasification. A pump (1-22) and a condenser (1-21) may be connected with the second fluid loop.

In another embodiment, a second bottom cycle can be used (bottom cycle 2 (1-20)). This cycle utilizes the waste heat from the first (main) bottom cycle and also can be integrated with the solar thermal receiver and/or thermal storage and/or topping cycle.

In another embodiment, the topping cycle could be a condensing cycle (not supercritical) and a pump(s) may be used instead or in addition to, the compressor(s).

In any heat exchange medium there are at least two fluid lines (each has at least one inlet and one outlet). The flow direction through one fluid could be, for example, in parallel, counter and/or cross direction with the other fluid lines.

First and second energy generation systems may be connected thermally with the integration fluid loop. The integration fluid loop serves to provide a mean by which thermal energy is transferred between the first and second energy generation systems. The integration fluid loop is preferably only in thermal contact with the first and second energy generation systems without being in fluid contact with the first and second energy generation systems. In FIG. 1, for example, the integration fluid loop (1-16) comprises a gas and/or liquid that may be the same or different from the fluids in the fluid loops of the first and second energy generation systems. Nonetheless, the fluid in the integration fluid loop does not mix with the fluids of the first and second energy generation systems or the fluid that is used in the solar thermal energy capture portion of the solar thermal energy generation system.

The integration fluid loop provides a means for scavenging, recycling or recovering thermal energy from the solar heat exchanger (FIG. 1 (1-23)) and/or the low and/or high temperature recuperators (FIGS. 1 (1-6) and (1-7), respectively). The solar heat exchanger (1-23) could be integrated with thermal storage tank. (e.g. inside the tank). The first energy generation system utilizing the Brayton cycle may operate most efficiently within a temperature realm achieved when thermal energy storage is high in the hot storage tank (FIG. 1 (1-13)). However, at times when the hot storage tank is not undergoing recharge with heat or thermal energy from the solar receiver, the efficiency of the first energy generation system may decrease and/or may fall below a minimum at which the first energy generation system can provide a net power gain. Nonetheless, the hot storage tank may still contain usable thermal energy. Likewise, the solar heat exchanger (FIG. 1 (1-23)) may likewise include residual thermal energy. This is also the case for the low and high thermal recuperators which may contain residual or salvageable amounts of thermal energy. The inclusion of a second energy generation system utilizes this excess or residual thermal energy to generate power.

The fluid integration loop serves to transfer thermal energy present as residues or waste thermal energy in the solar cycle and/or the first energy generation system to the second energy generation system. In addition the thermal energy from the integration fluid loop may be shared with a further bottom cycle such as a second Rankine cycle (FIG. 1 (1-20)).

The integration fluid loop may operate continuously such that thermal energy is transferred from one or more of the solar heat exchanger, the low thermal recuperator and/or the high thermal recuperator to the second energy system during operation of the first energy generation system. In a preferred embodiment of the invention the second energy generation system obtains thermal energy from the fluid integration loop only during periods when the first energy generation system is operating outside minimum energy generation thresholds. For example, at times when the hot storage tank is near a maximum temperature, e.g., above its 24 hour average temperature and/or above its 24 hour average total thermal energy content, the integration fluid loop is either isolated such that there is no thermal transfer between the first energy generation system and the second energy generation system, or is in an idle mode in which thermal energy transfer between first and second energy generation systems is at a minimum level. For example, when power generation is more than 50% of the maximum power generation provided by the first energy generation system, the integration fluid loop is in a halted mode or in an idle mode such that energy generation from the second energy generation system is less than 50% the maximum energy generation provided by the second energy generation system.

A control system serves to regulate fluid flow in any of the fluid loops of the first energy generation system (FIG. 1 (1-9)), the fluid loop in the second energy generation system (FIG. 1 (1-19)), and the integration fluid loop (FIG. 1 (1-16)). The control system may comprise a series of valves and/or restriction devices that function to regulate flow in the respective fluid loops. By regulating fluid flow in any of the respective loops, the amount of thermal exchange and power generation of the first and second energy generation systems may be controlled. During periods of maximum hot storage tank thermal energy, the control unit functions to permit full or nearly full fluid flow in the fluid loop of the first energy generation system to thereby maximize energy generation from the first and second turbines. As the total energy in the hot storage tank decreases and the efficiency of the first energy generation system decreases leading to a decrease in power generation, the fluid control unit may increase fluid flow in the integration fluid loop to transfer additional or residual heat from the solar heat exchanger to the low and/or high thermal recuperators. At the same time, the control unit may maintain or provide additional flow in the fluid flow loop of the second energy generation system. By doing so, the integration fluid loop scavenges residual and/or waste thermal energy present in either the solar subsystem and/or the first energy generation system and permits its transfer to the second energy generation system.

Later during a 24 hour cycle when additional solar thermal energy is transferred into the hot storage tank, the fluid flow control unit may function to restrict flow in the integration fluid flow loop and/or the fluid flow loop for the second generation system and increase fluid flow in the fluid flow loop of the first energy generation system thereby again returning maximum energy generation to the first energy generation system.

Figure 2:
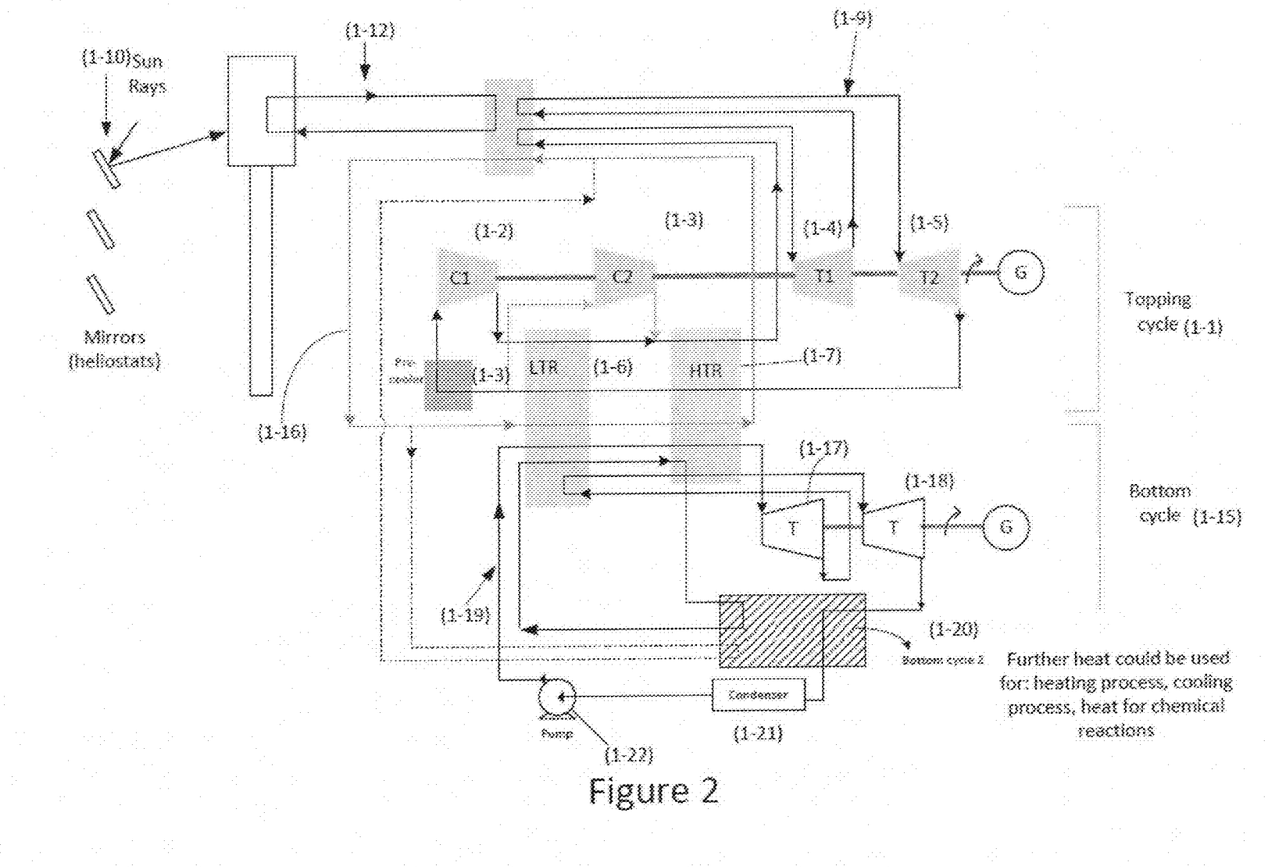
FIG. 2, shows a system without thermal storage which may be used for indirect heating as re-compression with two turbines.
Figure 3:
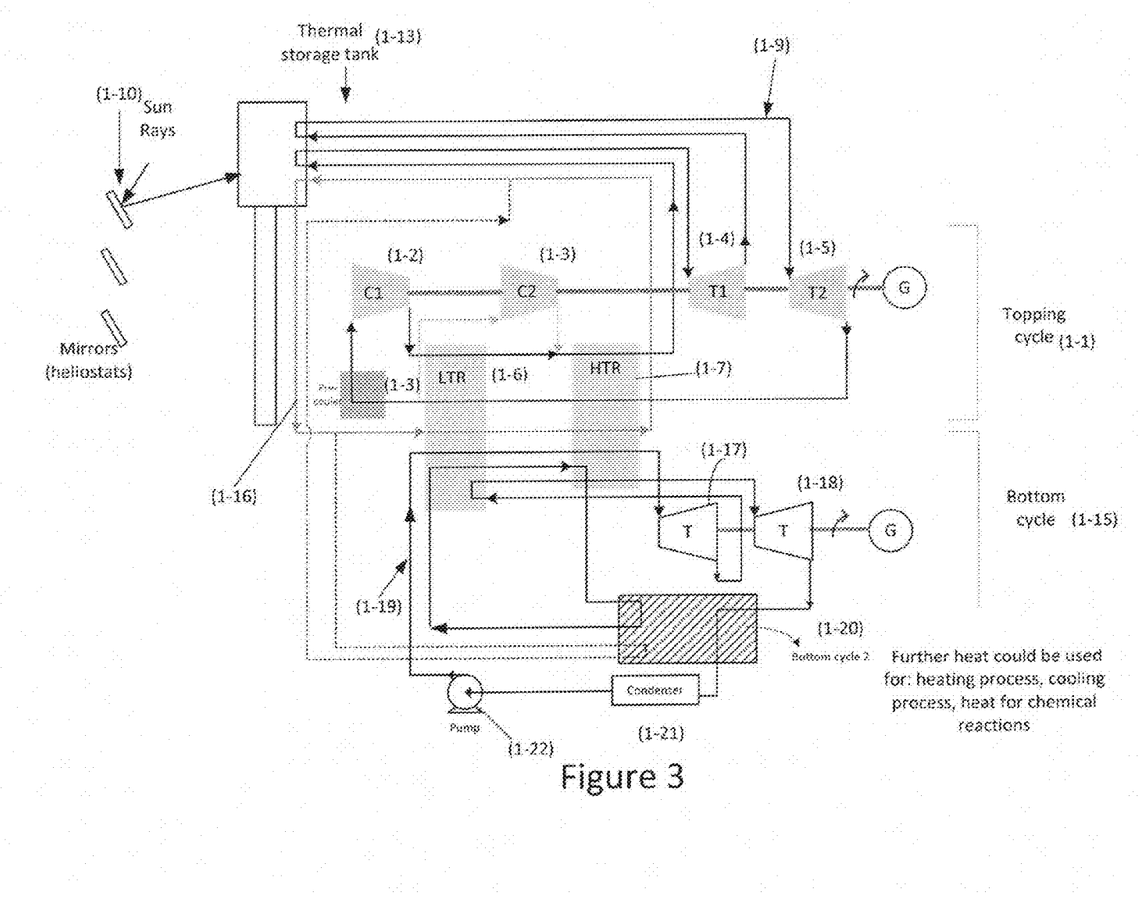
FIG. 3, shows a system without thermal storage and in which fluids are directly heated through the central receiver subsystem as re-compression with two turbines.

In another embodiment, FIG. 2, there is no thermal storage. This configuration is intended for the case of indirect heating. For example, this configuration can be used for the case of having two different fluids: One for the solar subsystem and one (or more) for the topping cycles(s) and/or bottom cycle(s).

In another embodiment, FIG. 3, there is no thermal storage and the fluids are directly heated through the central receiver subsystem. This embodiment has the advantage of eliminating the heat lost through the solar heat exchanger and saving its cost.

In another embodiment, in which the thermal storage exist and can be used as an optional when needed or it can be used for at least one of the cycles (topping cycle or bottom cycle(s).

Figure 4:
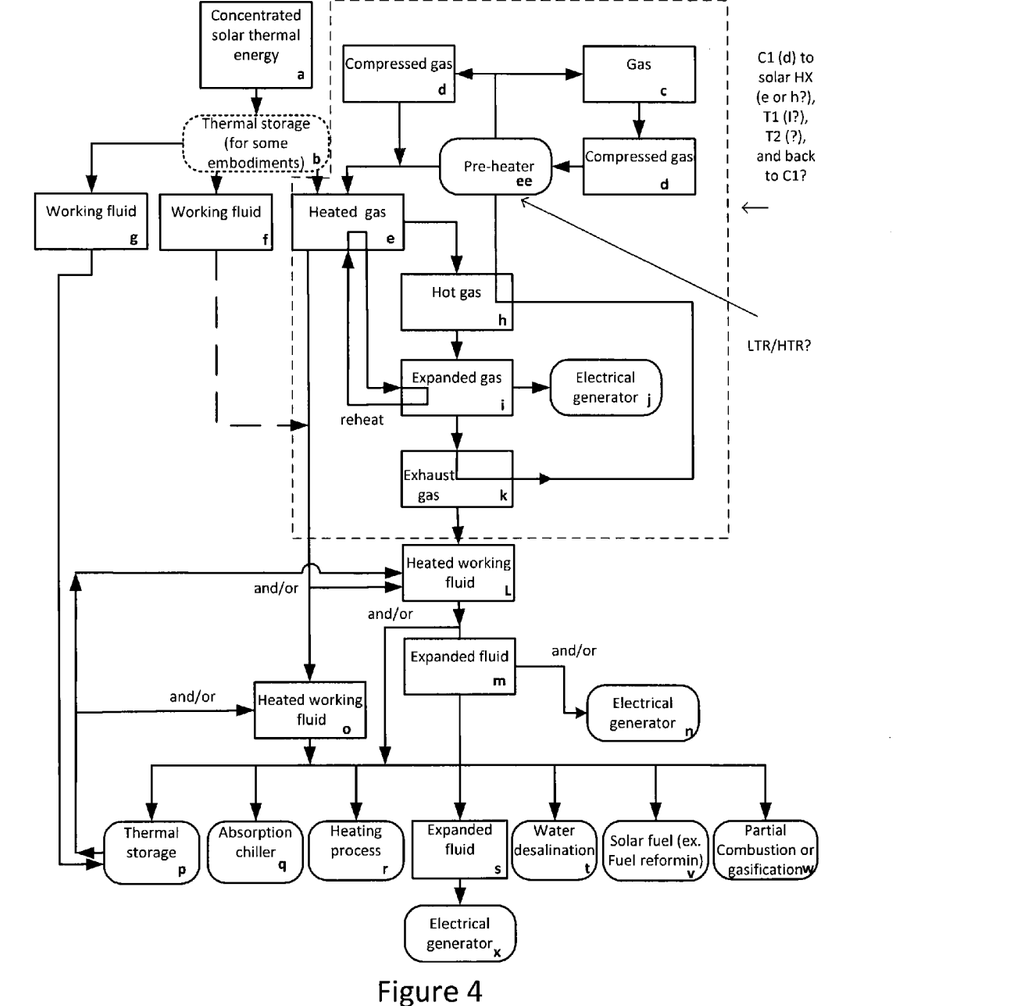
FIG. 4 depicts a block diagram for systems that include a Brayton cycle.

FIG. 4 depicts a block diagram that represents FIGS. 1-3, in addition to some other possible embodiments. Solar energy subsystem (a) heats a working fluid. This fluid can be used to heat directly other fluids (c, e, f, g) and/or indirectly through a thermal storage (b). A relatively cold gas (c) (or a mixture of gases) is compressed through a compressor (d) and then heated through (e) to obtain a hot gas (h) that has high energy to be expanded through turbine(s) (i). For some embodiments, between at least two independent turbines (and/or at least one turbine with at least two stages) there could be reheating of the gas to enhance the efficiency between (i) and (e) or (i) and (b), for example. Due to the gas expansion, mechanical energy is produced and thus can be used to obtain an electrical energy (j), for example. After the expansion of the gas, it still has relatively high temperature (k) and, thus, it can be used as a heat source to other cycle through a heat exchanger (L). As an optional for some embodiments the exhaust gas (k) can be used to pre-heat the hot gas (ee) to improve the efficiency. Different cycles can be integrated through (L), for different purposes such as: mechanical power (m) and thus (n), cooling (q), heating (r), low energy mechanical power (s and x), water desalination (t), solar fuel (example fuel reforming) (v), heat for partial combustion (w), and/or heat to produce steam (r). In addition, for some embodiments, blocks (p-x) may receive heat from (a) and/or (b).

Note that the different configurations of the supercritical Brayton cycles below are for the main configurations of the supercritical Brayton cycles and other possible different configurations can use the methods proposed in the patent application.

There are several types of Brayton cycles (topping cycles) that can be used instead of the one shown in FIGS. 1-3. Before explaining these cycles, same topping cycle in FIGS. 1-3 is illustrated in FIG. 5.

Figure 5:
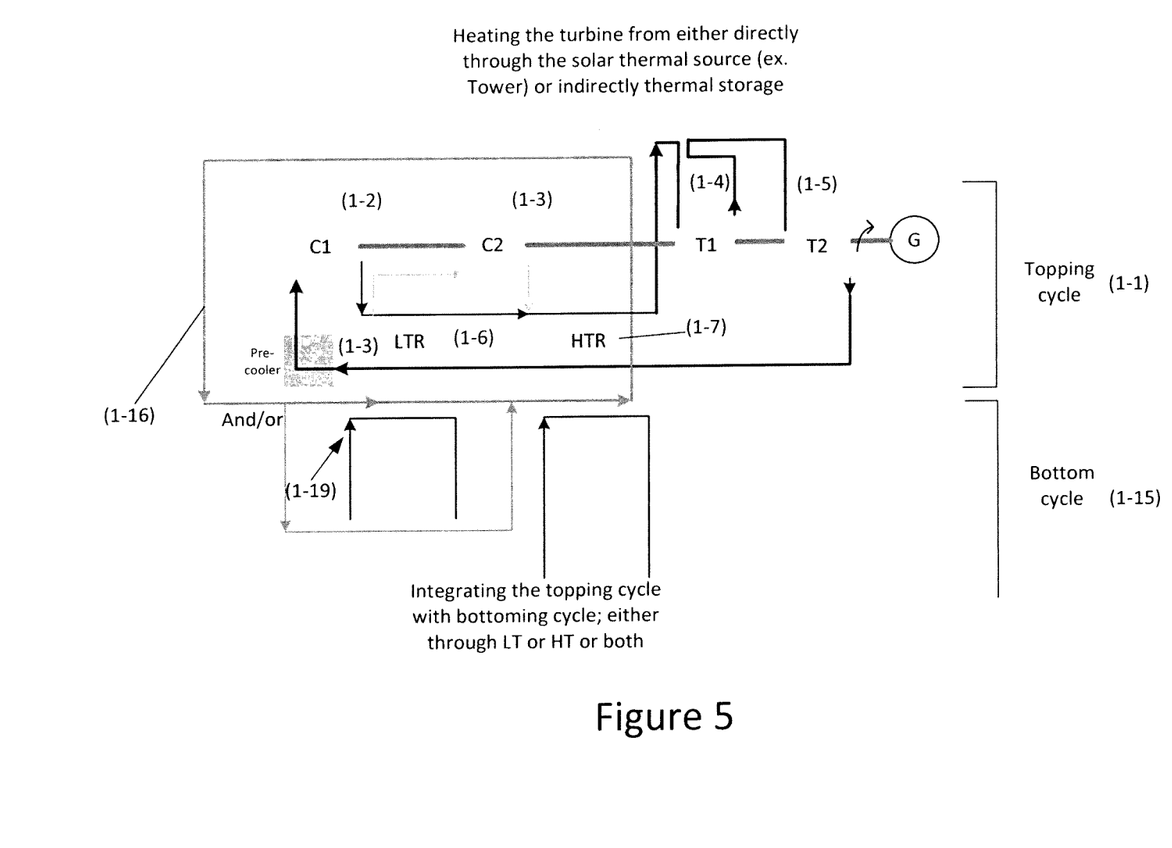
FIG. 5 shows several types of Brayton cycles (topping cycles)
Figure 6:
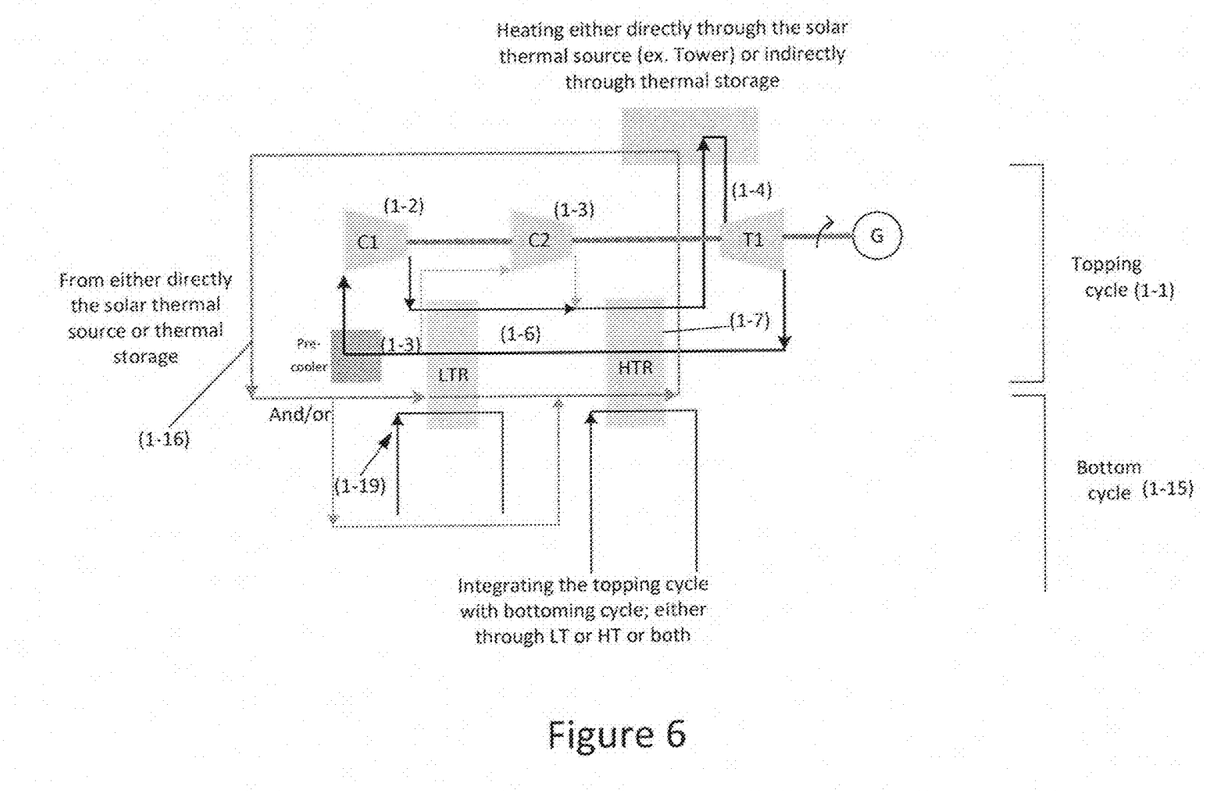
FIG. 6 shows a Brayton cycle with only one turbine without reheating as a recompression cycle.

FIG. 6 shows similar cycle to FIG. 5; however, there is only one turbine without reheating.

Figure 7:
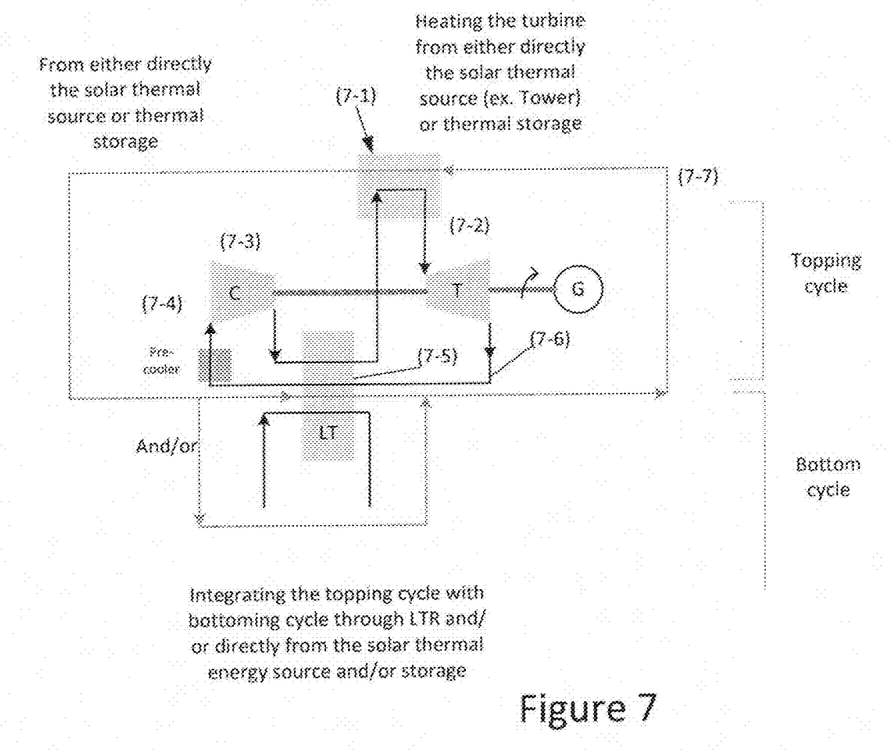
FIG. 7 shows a simple regeneration Brayton cycle having only one compressor and no recompression.

FIG. 7 depicts regeneration Brayton cycle that includes a heat source (either direct solar or solar storage—(7-1)), turbine (7-2), compressor (7-3), pre-cooler ((7-4), low thermal recuperator (7-5), first fluid loop (7-6), integration loop (7-7). There is only one compressor and hence there is no recompression. Furthermore, more than one compressor could be used with no recompression.

Figure 8:
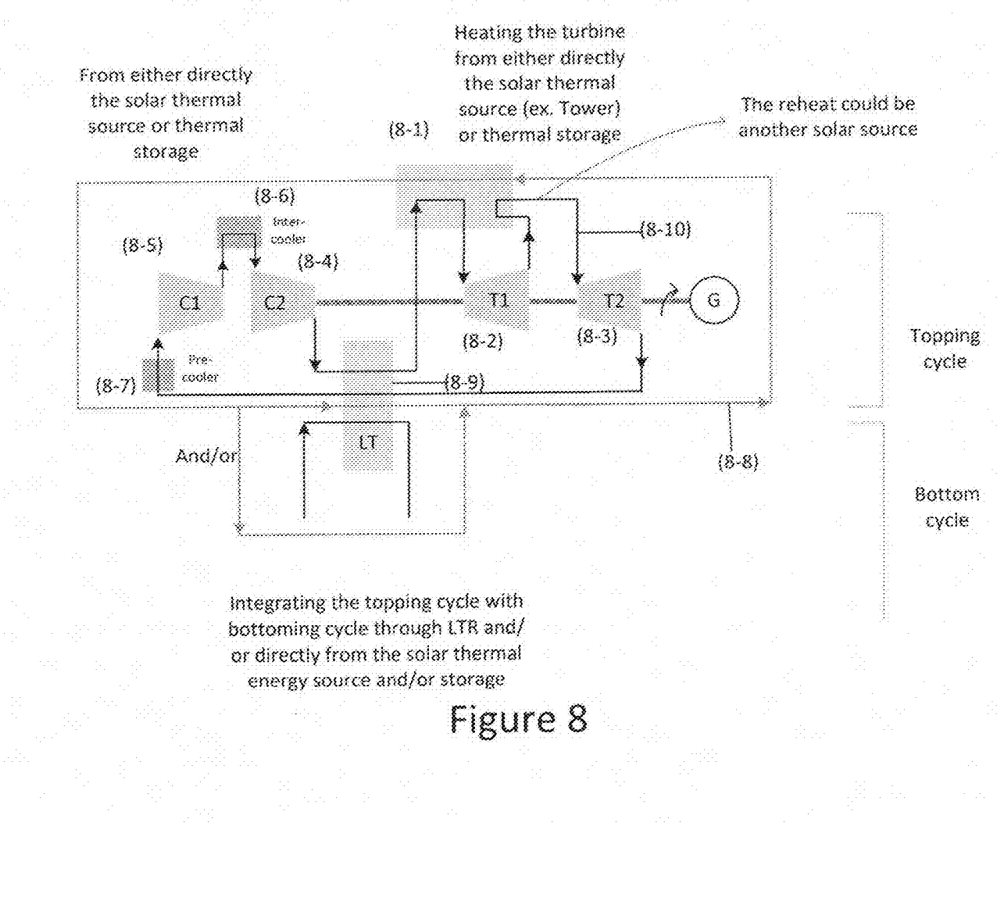
FIG. 8 depicts a Brayton cycle without recompression as a regeneration $sCO_2$ cycle with intercooling and reheating.

FIG. 8 depicts a Brayton cycle without recompression. This cycle may have at least a heat source (8-1), two compressors (8-4) and (8-5) (or two compressor stages) in which between at least two compressors an inter-cooler (8-6) may be used to improve the efficiency and the cycle has at least one turbine. In other embodiment this cycle may have at least two turbines (8-2) and (8-3) (or two turbine stages) in which between at least two the turbine stages may have reheating (8-10) to enhance the efficiency and the cycle has at least one compressor, an integration loop (8-8) and/or a pre-cooler (8-7). In other embodiment, there could be at least two turbines (or two turbine stages) and at least two compressors (or two compressor stages). In brief FIG. 8 shows three options i—at least two compressors (or two compressor stages) and one turbine, ii—at least two turbines (or turbine stages) and one compressor, or iii—a combination of both. In any of the three stages, intercooling may be used between at least two compressors (or between a compressor stages) and/or reheating may be used between at least two turbines (or between a turbine stages)

Figure 9:
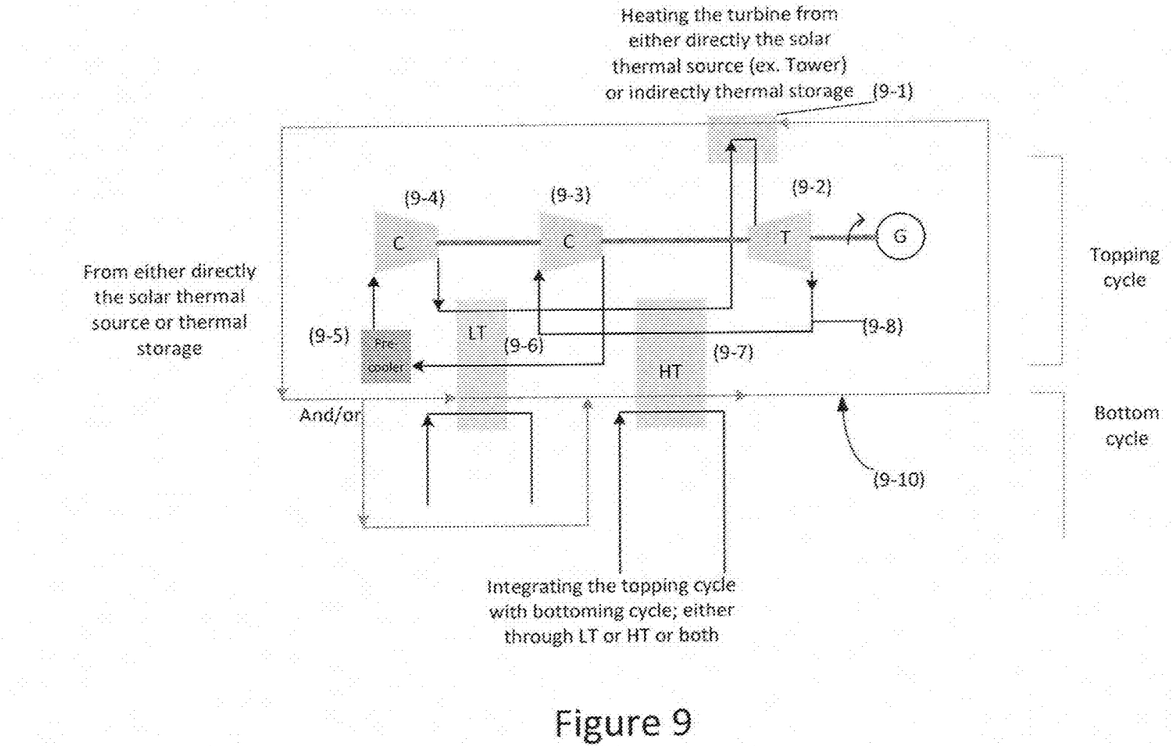
FIG. 9 depicts a pre-compression supercritical cycle as a pre-compression $sCO_2$ cycle.

FIG. 9 depicts a pre-compression supercritical cycle. In this cycle, the fluid exits from the turbine (9-2) is partially cooled down through HTR (9-7) and compressed through the second compressor (C2) (9-3) and then the fluid is further cooled down through LTR (9-6) and the pre-cooler (9-5) and then enters the main compressor (C1) (9-4). In this cycle there could also be more than one turbine (or turbine stages) with reheating option to improve the efficiency. The thermal source (e.g., solar) (9-1) and integration loop (9-10) may also be present. In addition re-compression can be used instead of pre-compression.

Figure 10:
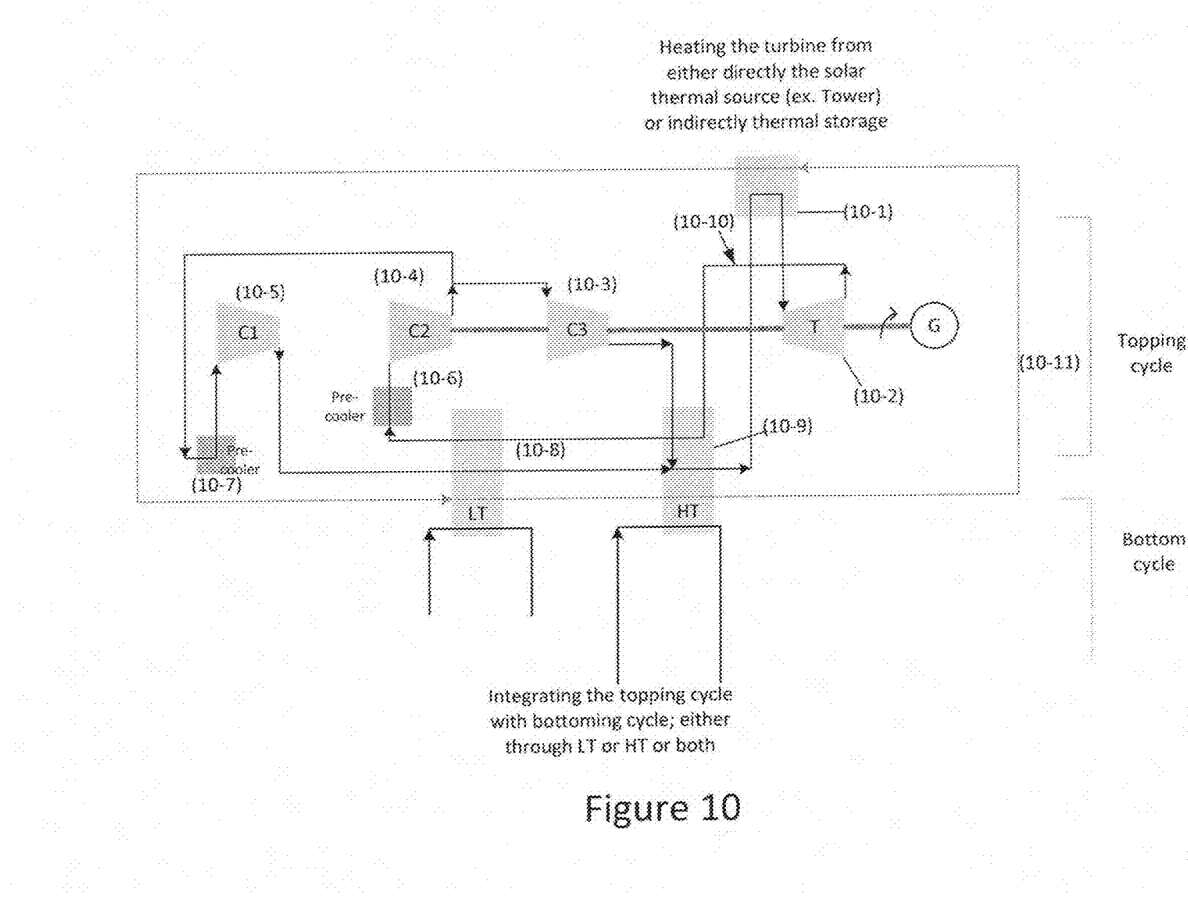
FIG. 10 depicts a partial cooling supercritical Brayton cycle as a partial cooling $sCO_2$ cycle.

FIG. 10 depicts a partial cooling supercritical Brayton cycle. The fluid that is exits from the turbine (10-2) is cooled before it enters the second compressor (C2) (10-4). Then part of it compressed through C3 (10-3) while the other part is cooled down through a pre-cooler (10-7) before it compressed through C1 (10-5). The fluid exits from C1 and C3 can merge together, for example in the HTR. For other embodiment more than one turbine (or turbine stages) could be used with a reheating option. Also, inter-cooling between compressor stages may be used when possible (10-6). LTR (10-8) and HTR (10-9) are included together with a thermal source (10-1) and integration loop (10-10).

Figure 11:
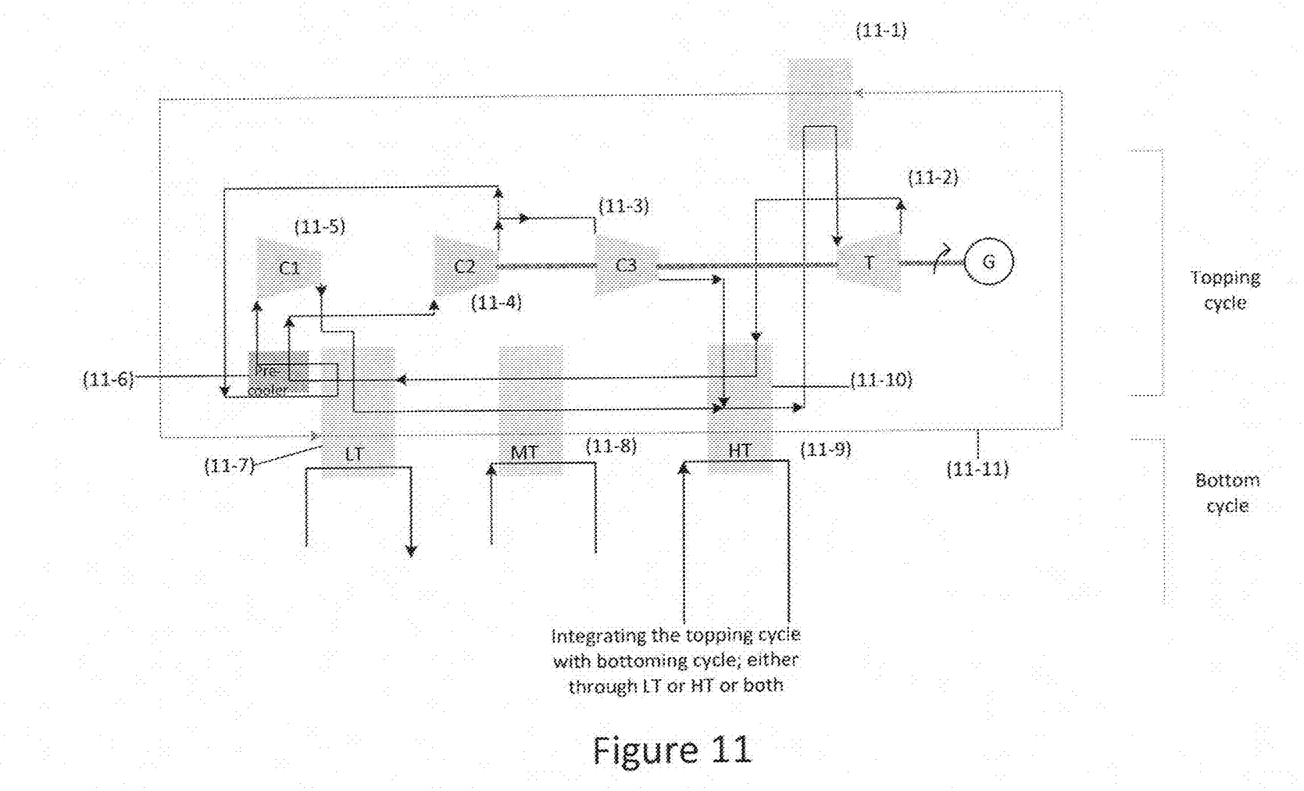
FIG. 11 depicts a partial cooling supercritical with regeneration as partial cooling with improved regeneration.

FIG. 11 depicts a partial cooling supercritical with regeneration. It is similar to FIG. 10; however, regeneration is used to improve the efficiency. Furthermore, turbine(s)

reheating and/or compressor(s) inter-cooling may be used. Fluid that exits from the turbine (11-2) is cooled before it enters the first compressors (C2) (11-4) and (C1) (11-5). Then part of it compressed through C3 (11-3) while the other part is cooled down through the pre-cooler (11-6) before it compressed through C1 (11-5). The fluid exits from C1 and C3 can merge together, for example in the LTR (11-7), MTR (11-8) and/or HTR (11-9). For other embodiment more than one turbine (or turbine stages) could be used with a reheating option. Also, inter-cooling between compressor stages may be used when possible (10-6). A thermal source (11-1) and integration loop (11-11) are present.

In other embodiments for any supercritical Brayton cycle configuration, reheating may be used between turbines and/or turbine(s) stages. Further, for any supercritical Brayton cycle inter-cooling may be used between compressors and/or compressor(s) stages.

Figure 12:
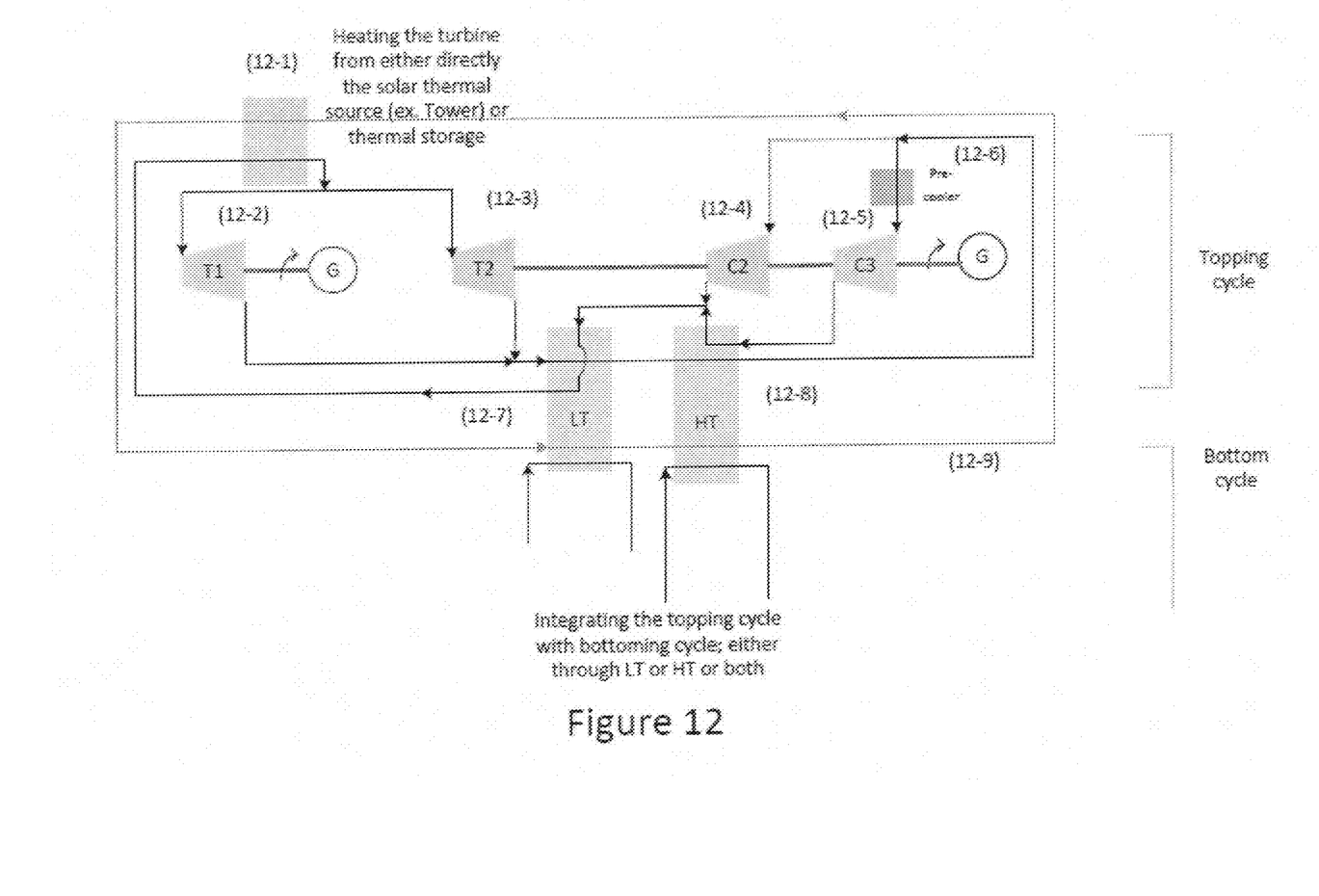
FIG. 12 depicts a supercritical Brayton cycle with at least two independent turbines.

FIG. 12 depicts a supercritical Brayton cycle with at least two turbines, one turbine is used to rotate the compressor(s) while the other turbine is used to produce mechanical power and thus electrical power. In other embodiment another turbine (or turbine stages) with reheating as an option can be used to produce electrical power and/or to rotate the compressor. Fluid that exits from the turbines (12-2) and (12-3) passes through LTR (12-7) and (12-8) before it enters compressors (C2) (12-4) and (C3) (12-5) after passing through pre-cooler (12-6). A thermal source (12-1) and integration loop (12-9) are present.

In another embodiment, the current concepts can be used for Brayton cycle as a topping cycle, such as the Brayton cycle based on gas turbine. In this embodiment, solar energy can be used to preheat a gas (e.g., air) and/or fuel before combustion. Or in another embodiment, the solar energy can be used for fuel reforming and/or gasification purpose(s). In either of the two embodiments, one or more bottom cycles can be used. The bottom cycle could be for the purpose of producing mechanical energy (and, hence, electrical power), such as Brayton cycle, Rankine cycle, or Kalina cycle; or a bottom cycle that produces distilled water, or a cooling cycle or a heating process, or for fuel reforming, or for chemical process, or for enhancing combustion, or for steam production. In the case the topping cycle is not working or there is no enough waste energy from the topping cycle to run the bottom cycle, the heat collected through solar energy (either directly from the sun irradiation or the thermal storage) can be used for the bottom cycle. In addition, in other embodiment, even if there is enough energy to run the topping cycle, the solar energy could be used to augment the bottom cycle.

In its different embodiments the present disclosure provides several important benefits in comparison to conventional power cycles. During low solar irradiation there is no enough energy to operate the system. Therefore, it can be sent directly to the lower cycle (bottom cycle) which requires low heat energy value (lower temperature) to operate. This results in increasing the operating time for the plant and hence improves its performance per 24 hours. Therefore, the average levelized cost decreases.

When run under only low heat input, heat is sent directly to the second stage turbine (or separated turbine unit) (in the topping cycle) which operates at lower temperature and hence maximizes the operating time of the plant. Also, the heat can be used to the bottom cycle(s).

In one embodiment the system includes a Rankine cycle, preferably a steam Rankine cycle, as a topping cycle receiving high solar radiation and the lower cycle (bottom cycle) may uses another fluid other than water (steam). A Kalina cycle is optionally included as the bottom cycle.

In an embodiment the main cycle (topping cycle) is a supercritical Brayton cycle coupled to a lower cycle (bottom cycle) for power production such as a condensing Brayton cycle, an organic Rankine cycle, a steam Rankine cycle, or a Kalina cycle. Furthermore, the lower (bottom cycle) could be for a type of energy production other than power (e.g., electrical) generation such as cooling, water desalination, heating, chemical process, fuel reforming.

A thermal storage system can be used to operate the lower cycle only and/or part of the topping cycle during for example night time. This results in increasing the operating time for the plant and hence improves its performance per 24 hours. Therefore, the average levelized cost decreases. In the topping cycle, one turbine, or two or more turbines may be used; similarly one compressor or two or more compressors may be used.

In some embodiments, an external heating source, other than solar heating can be used to augment the operation of the first and/or the second generation system. Examples of such source are fossil fuel with boiler, biomass with burner, or renewable energy source such as geothermal energy. Such heating source can be used when there is low solar radiation or during night time for example.

Obviously, numerous modifications and variations of the present invention are possible in light of the above teachings. It is therefore to be understood that within the scope of the appended claims, the invention may be practiced otherwise than as specifically described herein.

The invention claimed is:

1. A solar thermal energy generation system, comprising:
a solar receiver connected to a hot storage tank and a cold storage tank by a first fluid loop, wherein the first fluid loop is in thermal contact with a first heat exchanger;
a first energy generation system in the form of a supercritical Brayton cycle comprising a second fluid loop, a first compressor, a second compressor, a first turbine, a second turbine, a low thermal recuperator, a high thermal recuperator and a pre-cooler, wherein the second fluid loop is in thermal contact with the first heat exchanger, the low thermal recuperator and the high thermal recuperator; and
a second energy generation system comprising a third fluid loop, a third turbine, a fourth turbine, the low thermal recuperator, the high thermal recuperator, a pump and a condenser, wherein the third fluid loop is in thermal contact with the low thermal recuperator and the high thermal recuperator, connected to an integration loop and the first heat exchanger,
wherein the first and second energy generation systems are thermally connected by the integration loop in thermal contact with the first heat exchanger, the low thermal recuperator and the high thermal recuperator,
wherein the first heat exchanger supplies thermal energy to at least one of the first and second energy generation systems using thermal energy from at least one of the solar receiver and the hot storage tank,
wherein the first heat exchanger supplies thermal energy to the first energy generation system by heating air entering the first turbine, the air exiting the first turbine is directed back through the first heat exchanger, into the second turbine, through the high thermal recuperator and the low thermal recuperator, and
the first heat exchanger supplies thermal energy to the second energy generation system by heating the integration loop to heat the low thermal recuperator, the high thermal recuperator, and the third fluid loop.

2. The solar thermal energy generation system of claim 1, wherein the second fluid loop comprises $CO_2$.

3. The solar thermal energy generation system of claim 1, wherein the second energy generation system is at least one selected from the group consisting of a condensing Brayton cycle, an organic Rankine cycle, a steam Rankine cycle, and a Kalina cycle.

4. The solar thermal energy generation system of claim 1, wherein the first fluid loop comprises at least one selected from the group consisting of a molten salt, steam and a gas.

5. The solar thermal energy generation system of claim 1, wherein the second energy generation system is at least one selected from the group consisting of a water desalination process, a multi-stage flash distillation, a multiple-effect distillation, a vapor-compression process, a humidification dehumidification process and a reverse osmosis process.

6. The solar thermal energy generation system of claim 1, wherein the integration loop includes a fluid control unit with instructions to block circulation of fluid in the integration loop during power generation by the first energy generation system.

7. The solar thermal energy generation system of claim 1, further comprising a fluid control unit in the integration loop with instructions to control a valve to permit thermal transfer from the solar heat exchanger to the low thermal recuperator and the high thermal recuperator to the second energy generation system.

8. The solar thermal energy generation system of claim 1, wherein the second energy generation system generates energy obtained as waste heat from the first energy generation system.

9. The solar thermal energy generation system of claim 1, wherein both the first fluid loop and the second fluid loop comprise gases, wherein the gas of the first fluid loop has a higher condensation temperature than the gas of the second fluid loop.

10. The solar thermal energy generation system of claim 1, further comprising at least one of (i) an intercooler between the first and the second two compressors and (ii) a reheater between the first and the second turbines.

11. The solar thermal energy generation system of claim 9, wherein the gases, are selected from the group consisting of helium and nitrogen.

12. The solar thermal energy generation system of claim 1, wherein the second energy generation system is at least one selected from the group consisting a heating process, a cooling process, a fuel reforming process and a gasification process.

13. The solar thermal energy generation system of claim 1, wherein an external heating source from fossil fuel or geothermal energy is used to augment the operation of the first and/or the second generation system.

* * * * *